UNITED STATES PATENT OFFICE.

JOSEPH C. TIFFANY, OF COXSACKIE, NEW YORK.

IMPROVEMENT IN PROCESSES FOR PREVENTING OR REMOVING NAPHTHALINE DEPOSITS IN GAS-CONDUITS.

Specification forming part of Letters Patent No. 170,414, dated November 23, 1875; application filed November 19, 1875.

*To all whom it may concern:*

Be it known that I, JOSEPH CAPRON TIFFANY, of Coxsackie, in the county of Greene and State of New York, have invented certain new and useful improvements for absorbing and preventing the deposition of naphthaline and other condensable products in the mains and pipes of gas-works, of which the following is a specification:

This invention relates to certain improvements in the manufacture of illuminating-gas. In the manufacture of such gases the most formidable obstacle encountered is the deposition of naphthaline and other condensable products generated with the gas by destructive distillation, which collect in the mains and service-pipes, and lessen the capacity of the same for conveying and distributing the gas. These condensable products also constitute, in many instances, the richest illuminating constituents of the gas, and when thus condensed, besides creating obstructions in the mains and service-pipes, deteriorate the illuminating qualities of the gas to such an extent as to cause serious loss in its manufacture.

It has long been well known that the various liquid hydrocarbons would cut and dissolve these condensable products, and attempts have been made to employ such hydrocarbons for the purpose; but it has been found that such hydrocarbons merely hold the said condensable products mechanically in solution, and are liable to deposit them again upon changes of temperature, upon which account they have proved comparatively useless for the purpose.

My invention is designed to obviate the objections above mentioned — viz., the collection of said condensable products in the pipes, and to utilize the same for illuminating purposes by absorbing and chemically combining such products with the gas. This I accomplish by introducing into gases containing these condensable products the gas produced from paraffine or paraffine oils, which are rich in olefiant gas. It is a well-known fact that olefiant gas, as regards illuminating properties, is the best that can be made, and that, even under strong pressure and intense cold, does not deposit any tarry matter or other condensable products, and, therefore, does not lose its illuminating properties under any circumstances, and it is entirely free from ammoniacal and sulphur compounds. I have discovered that, in addition to these properties, such gas possesses a strong affinity for the condensable products deposited from other gases, absorbing and seizing hold of the same, forming a true chemical combination, and producing a compound gaseous product possessing no condensable constituents. I have taken advantage of this in my improved process of manufacturing illuminating-gas, and, by mixing and commingling the gas produced from paraffine or paraffine oils with ordinary illuminating-gas, I entirely prevent the deposition of such condensable products.

In carrying out my invention I produce the gas from the paraffine or paraffine oils in any well-known manner, and then introduce it into the main of the ordinary gas-works, between the retorts and the holder, or at any other convenient point, causing it to thoroughly mix and commingle with the other gas. The olefiant gas thus introduced, by reason of its strong affinity for naphthaline and the other condensable products of the gas, immediately unites and chemically combines with the same, and the whole forms a thoroughly-fixed gas, possessing no condensable constituents, the naphthaline or other condensable products forming part of the compound gas, and enhancing its illuminating qualities to an extent hitherto unknown in the manufacture of gas.

The compound gas thus produced, besides being incondensable, also possesses the property of dissolving and combining with any deposited naphthaline that may have collected in the pipes, thus affording a means of freeing the mains and pipes that have been in use from such deposits.

I find, in practice, that five per cent. in volume of olefiant gas, when introduced into the ordinary gas, will prevent the deposition of the condensable products; but when it is desired to take up and absorb such condensable products that have already been deposited, it will be necessary to employ from ten to fifteen per cent. of olefiant gas; and if it is desired to remove such deposits quickly, olefiant gas alone may be used.

Having thus described my invention, what I claim, and desire to secure by Letters Patent, is—

In the manufacture of illuminating-gas, the within-described process for preventing and removing deposits of naphthaline and other similar condensable constituents of gas, and for utilizing such constituents, which consists in introducing into the gas, after it leaves the retorts, gas from paraffine or paraffine oils, for the purpose of absorbing and combining with such naphthaline or other similar condensable products, substantially as herein set forth.

In testimony that I claim the foregoing, I have hereunto set my hand in the presence of the subscribing witnesses.

JOSEPH CAPRON TIFFANY.

Witnesses:
CHAS. L. COOMBS,
A. H. NORRIS.